US012586433B2

(12) United States Patent (10) Patent No.: US 12,586,433 B2
Nakashima et al. (45) Date of Patent: Mar. 24, 2026

(54) PACKAGE HAND-OVER APPARATUS, PACKAGE HAND-OVER METHOD, AND PROGRAM

(71) Applicant: TOYOTA JIDOSHA KABUSHIKI KAISHA, Aichi-ken (JP)

(72) Inventors: Issei Nakashima, Tokyo-to (JP); Toru Miyagawa, Seto (JP); Hideo Hasegawa, Nagoya (JP); Yusuke Kinoshita, Tokyo-to (JP); Morihiro Masada, Nagoya (JP); Tomoaki Sakaguchi, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 287 days.

(21) Appl. No.: 18/337,429

(22) Filed: Jun. 20, 2023

(65) Prior Publication Data

US 2023/0410586 A1 Dec. 21, 2023

(30) Foreign Application Priority Data

Jun. 21, 2022 (JP) ................................. 2022-099347

(51) Int. Cl.
*G07C 9/25* (2020.01)
*B60W 60/00* (2020.01)
*G07C 9/00* (2020.01)
(52) U.S. Cl.
CPC ......... *G07C 9/25* (2020.01); *B60W 60/00256* (2020.02); *G07C 9/00563* (2013.01); *G07C 9/00896* (2013.01); *G07C 2009/0092* (2013.01)
(58) Field of Classification Search
None
See application file for complete search history.

(56) References Cited

U.S. PATENT DOCUMENTS

| | | | | |
|---|---|---|---|---|
| 9,652,912 | B2 * | 5/2017 | Fadell | ................... G06Q 10/08 |
| 10,388,092 | B1 * | 8/2019 | Solh | ......................... G07C 9/37 |
| 10,551,851 | B2 * | 2/2020 | Yu | ........................... B60P 3/007 |
| 11,099,562 | B1 * | 8/2021 | Ebrahimi Afrouzi | ....................... G05D 1/0225 |
| 11,468,391 | B2 * | 10/2022 | Felice | ................ G07C 9/00563 |
| 11,816,624 | B2 * | 11/2023 | Goldberg | ................. G08G 5/22 |
| 11,880,869 | B1 * | 1/2024 | Ta | ........................... G07C 5/008 |
| 11,972,391 | B2 * | 4/2024 | Matsunami | .......... G06Q 10/087 |
| 2019/0278274 | A1 | 9/2019 | Igata et al. | |
| 2022/0101252 | A1 | 3/2022 | Miyata et al. | |

FOREIGN PATENT DOCUMENTS

| | | |
|---|---|---|
| JP | 2002-132958 A | 5/2002 |
| JP | 2013-238971 A | 11/2013 |
| JP | 2016-088675 A | 5/2016 |
| JP | 2019-153211 A | 9/2019 |
| JP | 2022-057891 A | 4/2022 |

* cited by examiner

*Primary Examiner* — K. Wong
(74) *Attorney, Agent, or Firm* — HAUPTMAN HAM, LLP

(57) ABSTRACT

A package hand-over apparatus, a package hand-over method, and a program that can efficiently hand over an item that is preferably handed over to a receiver after a face-to-face confirmation are provided. A package hand-over apparatus includes a video call control unit configured to carry out a video call with a terminal apparatus of a sender by using a video call device, and a lock control unit configured to unlock a lock prohibiting hand-over of a package based on whether or not an input approving the hand-over is made to the terminal apparatus of the sender after a start of the video call.

11 Claims, 9 Drawing Sheets

130

210

PACKAGE HAND-OVER APPARATUS, PACKAGE HAND-OVER METHOD, AND PROGRAM

CROSS REFERENCE TO RELATED APPLICATIONS

This application is based upon and claims the benefit of priority from Japanese patent application No. 2022-099347, filed on Jun. 21, 2022, the disclosure of which is incorporated herein in its entirety by reference.

BACKGROUND

The present disclosure relates to a package hand-over apparatus, a package hand-over method, and a program.

In recent years, various techniques for delivering packages to a receiver have been developed. For example, Japanese Unexamined Patent Application Publication No. 2016-88675 discloses a delivery method performed by unmanned aerial vehicles. In this delivery method, a package is delivered to the receiver by an unmanned aerial vehicle equipped with a camera, and after an operator of a delivery service provision system has determined that a customer is included in an image captured by the camera, the package is handed over.

SUMMARY

In the delivery method disclosed in Japanese Unexamined Patent Application Publication No. 2016-88675, the operator of the delivery company determines whether or not a customer is at a delivery destination by checking an image of the camera. That is, this delivery method does not allow a sender to hand over the package after confirming the receiver face-to-face. For this reason, it is not possible to efficiently hand-over an item to the receiver, such as a medicine, that is preferably hand-over after a face-to-face confirmation.

The present disclosure has been made in the background of the above circumstances, and an object thereof is to provide a package hand-over apparatus, a package hand-over method, and a program that can efficiently hand over an item that is preferably handed over to a receiver after a face-to-face confirmation.

In an aspect of the present disclosure to achieve the above object, a package hand-over apparatus includes: a video call control unit configured to carry out a video call with a terminal apparatus of a sender by using a video call device; and a lock control unit configured to unlock a lock prohibiting hand-over of a package based on whether or not an input approving the hand-over is made to the terminal apparatus of the sender after a start of the video call.

According to this package hand-over apparatus, the package is handed over after the sender remotely confirms the receiver face-to-face. Thus, an item that is preferably handed over after a face-to-face confirmation can be efficiently handed over to the receiver.

In the above aspect, the lock control unit may not unlock the lock prohibiting the hand-over of the package when a user of the terminal apparatus has not been successfully authenticated as the sender.

With such a configuration, the package can be prevented from being handed over upon approval by a person other than the legitimate sender.

In the above aspect, an authentication unit configured to authenticate the receiver may be further included, and the video call control unit may be configured to carry out the video call with the terminal apparatus of the sender upon successful authentication of the receiver.

With such a configuration, the package can be more reliably prevented from being handed over to a wrong person.

In the above aspect, the lock control unit may not unlock the lock prohibiting the hand-over of the package when the unlock code entered by the receiver is not a correct unlock code.

With such a configuration, the package can be more reliably prevented from being handed over to a wrong person.

In the above aspect, a movement apparatus configured to move the package hand-over apparatus may be further included.

With such a configuration, the package can be delivered automatically, so that the package can be handed over to the receiver more efficiently.

In another aspect of the present disclosure to achieve the above object, a package hand-over method executed by a computer including: carrying out a video call with a terminal apparatus of a sender by using a video call device; and unlocking a lock prohibiting hand-over of a package based on whether or not an input approving the hand-over is made to the terminal apparatus of the sender after a start of the video call.

According to this package hand-over method, the package is handed over after the sender remotely confirms the receiver face-to-face. Thus, an item that is preferably handed over after a face-to-face confirmation can be efficiently handed over to the receiver.

In another aspect of the present disclosure to achieve the above object, a program for causing a computer to execute: carrying out a video call with a terminal apparatus of a sender by using a video call device; and unlocking a lock prohibiting hand-over of a package based on whether or not an input approving the hand-over is made to the terminal apparatus of the sender after a start of the video call.

According to this program, the package is handed over after the sender remotely confirms the receiver face-to-face. Thus, an item that is preferably handed over after a face-to-face confirmation can be efficiently handed over to the receiver.

According to the present disclosure, it is possible to provide a package hand-over apparatus, a package hand-over method, and a program that can efficiently hand over an item that is preferably handed over to a receiver after a face-to-face confirmation.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment of this disclosure is described in detail below with reference to the drawings. The following descriptions and drawings have been omitted and simplified as appropriate to clarify the explanation. In each drawing, similar components are given the same symbols, and repeated descriptions have been omitted as necessary.

Figure 1:
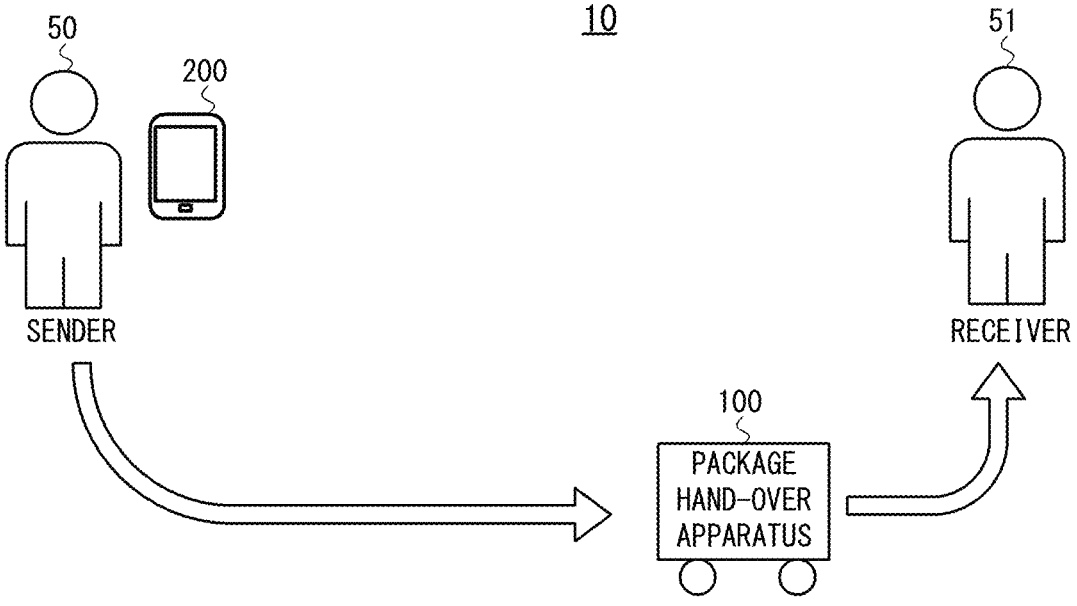
FIG. 1 is a schematic diagram showing an example of a configuration of a package hand-over system according to an embodiment.

FIG. 1 is a schematic diagram showing an example of a configuration of a package hand-over system 10 according to the embodiment. As shown in FIG. 1, the package hand-over system 10 includes a package hand-over apparatus 100 and a terminal apparatus 200. Note that in FIG. 1, in addition to the package hand-over system 10, a sender 50, who is a person sending a package, and a receiver 51, who is a person receiving the sent package, are also shown for understanding. The package hand-over apparatus 100 and the terminal apparatus 200 are communicably connected, for example, by wireless communication. The package hand-over apparatus 100 and the terminal apparatus 200 may be communicatively connected through a communication line such as the Internet.

Figure 2:
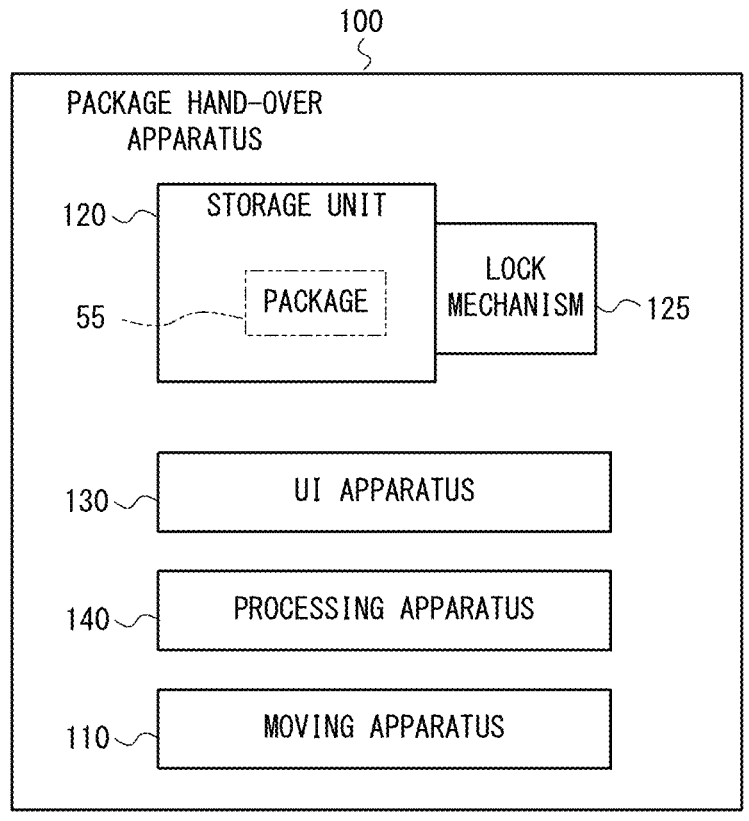
FIG. 2 is a block diagram showing an example of a configuration of a package hand-over apparatus according to the embodiment.

First, the package hand-over apparatus 100 will be described. The package hand-over apparatus 100 is an apparatus in which the package sent by the sender 50 is stored, and hands over the package received from the sender 50 to the receiver 51. In this embodiment, the package hand-over apparatus 100 is a robot performing autonomous movement. FIG. 2 is a block diagram showing an example of the configuration of the package hand-over apparatus 100 according to this embodiment. The package hand-over apparatus 100 includes a movement apparatus 110, a storage unit 120, a lock mechanism 125, a UI (User Interface) apparatus 130, and a processing apparatus 140.

The movement apparatus 110 is an apparatus for moving the package hand-over apparatus 100. For example, the movement apparatus 110 has a driving wheel and a driven wheel rotatably provided at a lower part of the package hand-over apparatus 100, and a motor for rotationally driving the driving wheel. The motor rotates the driving wheel through a reduction gear or the like. The motor rotates the driving wheel in response to a control signal from the processing apparatus 140 to enable forward and backward movements and rotation of the package hand-over apparatus 100. Thus, the package hand-over apparatus 100 can be moved to any position. The configuration of the movement apparatus 110 described above is an example and not limited to this. That is, any configuration that can move the package hand-over apparatus 100 to any position can be employed as the movement apparatus 110.

The storage unit 120 is a storage container that stores a package 55 received from the sender 50, and may be an internal space in a housing of the package hand-over apparatus 100 or a container that can be removed from the package hand-over apparatus 100 (e.g., a box). The package 55 is an item that needs to be handed over after a face-to-face confirmation. For example, the package 55 may be a medicine. In this case, the sender 50 may be, for example, a pharmacist or a physician, and the receiver 51 may be, for example, a patient taking the medicine received. The package 55 is not limited to a medicine. For example, the package 55 may be cash or the like.

The storage unit 120 is provided with the lock mechanism 125 to lock the package 55 in the storage unit 120 so that it cannot be taken out. That is, the lock mechanism 125 locks the storage unit 120 to prohibit hand-over of the package 55. For example, the storage unit 120 includes a door, and the lock mechanism 125 may lock the door to prevent it from opening. Specifically, the lock mechanism 125 is composed of, for example, an electromagnetic lock such as a solenoid lock, but the specific configuration is not limited to this.

Figure 3:
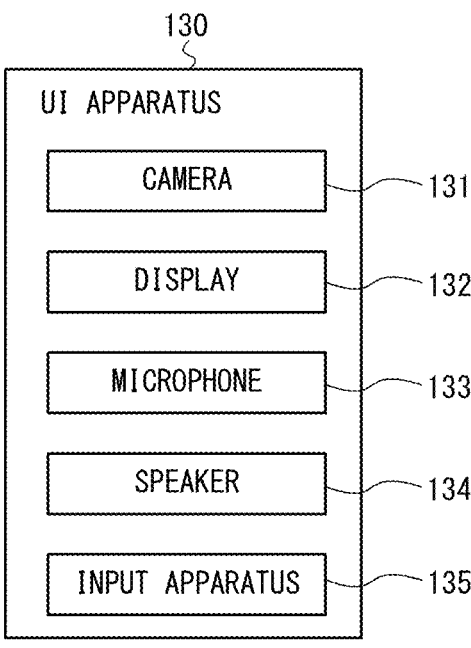
FIG. 3 is a block diagram showing an example of a configuration of a UI apparatus.

The UI apparatus 130 is an apparatus that functions as a user interface and, in this embodiment, includes devices shown in FIG. 3. FIG. 3 is a block diagram showing an example of the configuration of the UI apparatus 130. As shown in FIG. 3, in this embodiment, the UI apparatus 130 includes a camera 131, a display 132, a microphone 133, a speaker 134, and an input apparatus 135. The UI apparatus 130 is a generic name for these devices, and these devices may not be configured as a single device.

The camera 131, which is the UI apparatus 130 of the package hand-over apparatus 100, captures videos of the surroundings of the package hand-over apparatus 100 and outputs the captured video to the processing apparatus 140. The camera 131, in this embodiment, captures moving images, but may capture still images. When the package hand-over apparatus 100 moves to the receiver 51, a video of the receiver 51 is captured by the camera 131 of the package hand-over apparatus 100.

The display 132, which is the UI apparatus 130 of the package hand-over apparatus 100, displays the video according to the control of the processing apparatus 140. On this display 132, for example, the video of the sender 50 captured by the camera 131, which is the UI apparatus 130 of the terminal apparatus 200 described later, is displayed.

The microphone 133, which is the UI apparatus 130 of the package hand-over apparatus 100, acquires the sound around the package hand-over apparatus 100 and outputs a voice signal of the acquired sound to the processing apparatus 140. When the package hand-over apparatus 100 moves to the receiver 51, the voice of the receiver 51 is acquired by the microphone 133 of the package hand-over apparatus 100.

The speaker 134, which is the UI apparatus 130 of the package hand-over apparatus 100, outputs the sound according to the control of the processing apparatus 140. The speaker 134 outputs, for example, the voice of the sender 50 acquired by the microphone 133, which is the UI apparatus 130 of the terminal apparatus 200 described later.

The input apparatus 135, which is the UI apparatus 130 of the package hand-over apparatus 100, is an apparatus for a user (e.g., receiver 51) to make an input to the package hand-over apparatus 100. The input apparatus 135 is, for example, an input apparatus such as a pointing device or a keyboard. Examples of the pointing devices include a mouse, a trackball, a touch panel, and a pen tablet. The input apparatus 135 and the display 132 may be integrally configured as a touch panel.

Among the devices described above, those used for video calling may be referred to as video call devices. For example, the camera 131, the display 132, the microphone 133, and the speaker 134 may be collectively referred to as the video call devices.

Figure 4:
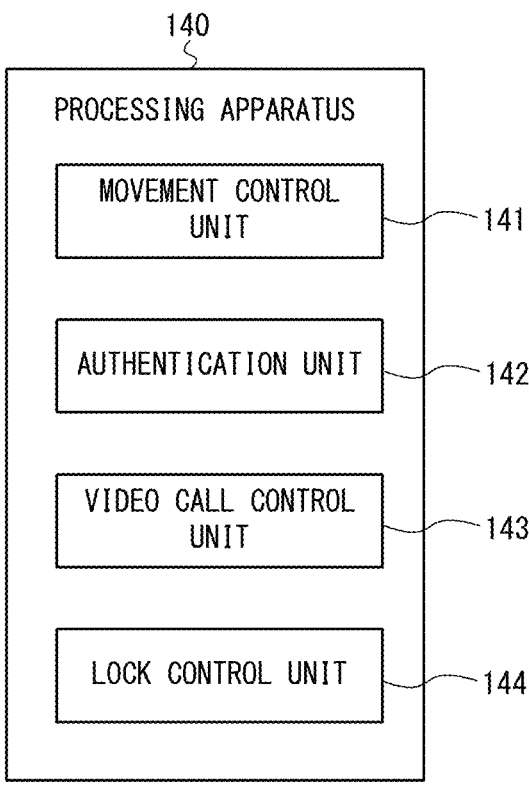
FIG. 4 is a block diagram showing an example of a functional configuration of a processing apparatus.

The processing apparatus 140 is an apparatus that carries out predetermined processing, including controlling an operation of the package hand-over apparatus 100. FIG. 4 is a block diagram showing an example of the functional configuration of the processing apparatus 140. As shown in FIG. 4, the processing apparatus 140 includes a movement control unit 141, an authentication unit 142, a video call control unit 143, and a lock control unit 144.

The movement control unit 141 controls the movement of the package hand-over apparatus 100. Specifically, the movement control unit 141 controls the operation of the movement apparatus 110. By transmitting a control signal to the motor of the movement apparatus 110, the movement control unit 141 controls the rotation of the driving wheel and can move the package hand-over apparatus 100 to any position.

The movement control unit 141 may control the movement of the package hand-over apparatus 100 by performing well-known controls such as feedback control and robust control based on rotation information about the driving wheel detected by a rotation sensor provided on the driving wheel. The movement control unit 141 may also move the package hand-over apparatus 100 autonomously by controlling the movement apparatus 110 based on information such as distance information detected by a distance sensor, for example, a camera or an ultrasonic sensor provided on the package hand-over apparatus 100 and map information about a moving environment. The camera 131 described above may be used to sense the moving environment when the package hand-over apparatus 100 moves.

The authentication unit 142 authenticates the receiver 51. That is, the authentication unit 142 performs authentication processing to confirm whether or not a person who intends to receive the package 55 is a legitimate receiver. For example, the authentication unit 142 may authenticate the receiver 51 by biometric authentication. In this case, the authentication unit 142 may perform the authentication based on whether or not features extracted from a face image of the receiver 51 captured by the camera 131 match the features of the face of the legitimate receiver registered in advance. In addition, the authentication unit 142 may perform biometric authentication based not only on the face but also on other physical features such as fingerprints and iris.

The authentication unit 142 may perform the authentication processing other than biometric authentication. For example, the authentication unit 142 may perform the authentication based on whether or not personal information input to the package hand-over apparatus 100 through the input apparatus 135 matches personal information about the legitimate receiver registered in advance. For example, the authentication unit 142 may perform authentication based on whether or not the receiver 51 can guess contents of the package 55. The reason such authentication is possible is that the legitimate receiver can be assumed to know the contents of the package 55. For example, if goods ordered by the receiver are delivered to the receiver as the package 55, the legitimate receiver knows the contents of the package. For example, if a medicine prescribed to the receiver by a doctor or the like is delivered to the receiver as the package 55, the legitimate receiver knows the contents of the package. Also, for example, the legitimate receiver may have been informed in advance by the sender of the contents of the package 55. In this way, it can be assumed that the legitimate receiver knows the contents of package 55. Therefore, in such a case, the authentication unit 142 may authenticate that the receiver 51 is the legitimate receiver if the information about the package 55 (which is the content information about the package) input from the receiver 51 to the package hand-over apparatus 100 through the input apparatus 135 matches the information about the actual package 55 registered in advance. In this manner, the authentication unit 142 may perform the authentication processing by acquiring specified information that proves the legitimate receiver.

The video call control unit 143 controls a video call with the terminal apparatus 200 of the sender 50 using the UI apparatus 130 (video call device) described above. The video call control unit 143 carries out a video call with the terminal apparatus 200 at the delivery destination of the package 55, i.e., at the receiver 51. Thus, the receiver 51 can make a video call with the sender 50.

For example, the video call control unit 143 establishes communication for a video call by sending a signal requesting the video call to the terminal apparatus 200, which is the terminal apparatus of the sender 50. Next, when communication is established, the video call control unit 143 transmits the video of the receiver 51 captured by the camera 131 of the package hand-over apparatus 100 and the voice of the receiver 51 acquired by the microphone 133 to the terminal apparatus 200. The video call control unit 143 also receives the video and voice transmitted from the terminal apparatus 200, displays the received video on the display 132 of the package hand-over apparatus 100, and outputs the received voice from the speaker 134 of the package hand-over apparatus 100.

In this embodiment, the video call control unit 143 carries out a video call with the terminal apparatus 200 of the sender when the authentication of the receiver 51 is successful. That is, the video call control unit 143 carries out a video call with the terminal apparatus 200 of the sender when the receiver 51 is authenticated by the authentication unit 142. In other words, the video call control unit 143 controls not to carry out a video call with the terminal apparatus 200 when the authentication of the receiver 51 by the authentication unit 142 fails. With such a configuration, the package 55 can be more reliably prevented from being handed over to a wrong person, i.e., a person other than the legitimate receiver.

It should be noted that the video call control unit 143 does not necessarily need the authentication of the receiver 51 to carry out a video call. In this case, the video call control unit 143 may, for example, carry out a video call triggered by an operation of the receiver 51 (e.g., an input that instructs a video call to be started) or triggered by an arrival of the package hand-over apparatus 100 at the delivery destination. When the authentication of the authentication unit 142 is not required, the processing apparatus 140 needs not include the authentication unit 142.

The lock control unit 144 controls a lock that prohibits hand-over of the package 55. That is, the lock control unit 144 controls the lock of the lock mechanism 125. When the package 55 is stored in the storage unit 120, the lock control unit 144 locks the storage unit 120 so that the package 55 cannot be taken out of the storage unit 120. The lock control unit 144 then unlocks the lock as follows. The lock control unit 144 unlocks the lock prohibiting hand-over of the package based on whether or not an input approving hand-over is made to the terminal apparatus 200 of the sender 50 after the video call is started. That is, the lock control unit 144 does not unlock the lock mechanism 125 when an input approving hand-over is not made from the sender 50 to the terminal apparatus 200 after the start of the video call between the sender 50 and the receiver 51.

The lock control unit 144 may unlock the lock mechanism 125 only on the condition that an input approving hand-over is made from the sender 50 to the terminal apparatus 200 after the start of the video call. However, the lock control unit 144 may use an additional condition to unlock. For example, the lock control unit 144 may unlock the lock only if the user of the terminal apparatus 200 is authenticated as a legitimate sender. In this case, the lock control unit 144 does not unlock the lock to prohibit the hand-over of the package 55 if the user of the terminal apparatus 200 is not successfully authenticated as a sender. With such a configuration, the package 55 can be prevented from being handed over upon approval by a person other than the legitimate sender.

For example, the lock control unit 144 may be unlocked only if an unlock code entered by the receiver 51 is the correct unlock code. In this case, the receiver 51 enters, for example, the unlock code, which has been previously notified to the legitimate receiver, into the package hand-over apparatus 100 through the input apparatus 135 before or after the input approving hand-over is made by the sender 50. The lock control unit 144 does not unlock the lock prohibiting hand-over of the package 55 if the unlock code entered by the receiver 51 is not the correct unlock code. With such a configuration, the package 55 can be more reliably prevented from being handed over to a wrong person, i.e., a person other than the legitimate receiver.

Figure 5:
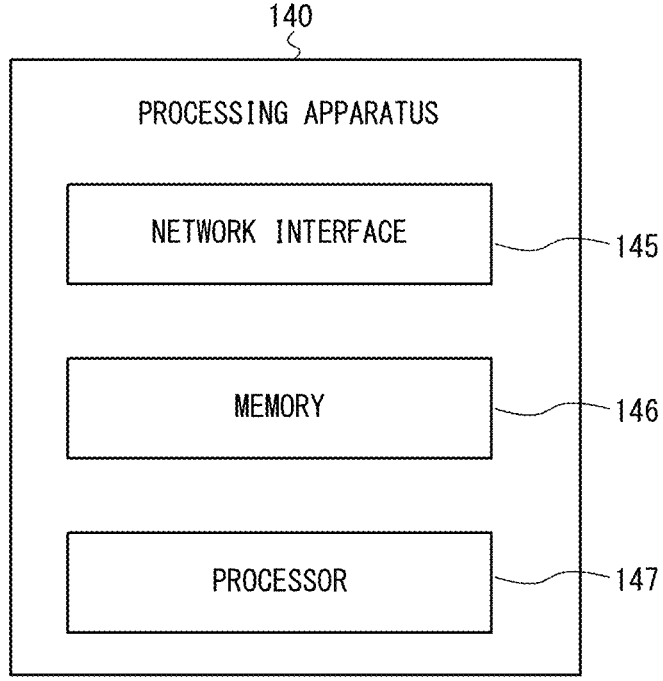
FIG. 5 is a block diagram showing an example of a hardware configuration of the processing apparatus.

Next, an example of a hardware configuration of a processing apparatus 140 will be described. FIG. 5 is a block diagram showing an example of a hardware configuration of the processing apparatus 140. As shown in FIG. 5, the processing apparatus 140 includes a network interface 145, a memory 146, and a processor 147.

The network interface 145 is used to communicate with any apparatus, such as the terminal apparatus 200. The network interface 145 may include, for example, a network interface card (NIC).

The memory 146 is composed of, for example, a combination of a volatile memory and a non-volatile memory. The memory 146 is used to store programs to be executed by the processor 147 and data to be used for various processing of the package hand-over apparatus 100.

The processor 147 reads the programs from the memory 146 and executes them to perform processing of each component shown in FIG. 4. The processor 147 may be, for example, a microprocessor, a Micro Processor Unit (MPU), or a Central Processing Unit (CPU). The processor 147 may include a plurality of processors.

In this way, the processing apparatus 140 has a function as a computer.

The program includes instructions (or software codes) that, when loaded into a computer, cause the computer to perform one or more of the functions described in the embodiment. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Figure 6:
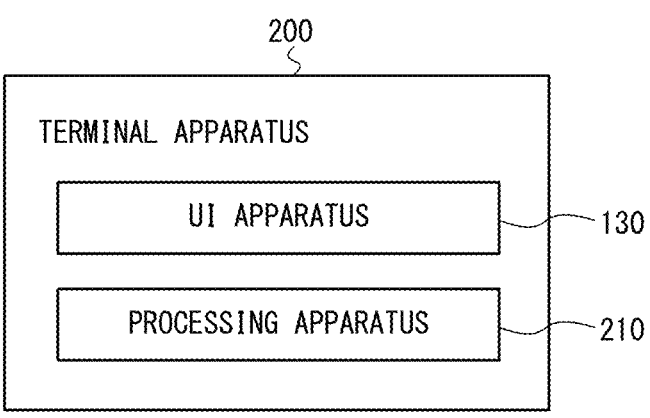
FIG. 6 is a block diagram showing an example of a configuration of a terminal apparatus.

Next, the terminal apparatus 200 will be described. The terminal apparatus 200 is a terminal apparatus used by the sender 50. Specifically, in this embodiment, the terminal apparatus 200 is used by the sender 50 when the receiver 51 receives the package 55 sent by the sender 50. The terminal apparatus 200 is, for example, a smartphone, a tablet terminal, a personal computer, or the like. FIG. 6 is a block diagram showing an example of the configuration of the terminal apparatus 200. The terminal apparatus 200 includes a UI apparatus 130 and a processing apparatus 210.

The terminal apparatus 200 also includes the UI apparatus 130 (see FIG. 3), in a manner similar to the package hand-over apparatus 100. The camera 131, which is the UI apparatus 130 of the terminal apparatus 200, captures videos of the surroundings of the terminal apparatus 200 and outputs the captured videos to the processing apparatus 210. A video of the sender 50 is captured by the camera 131 of the terminal apparatus 200.

The display 132, which is the UI apparatus 130 of the terminal apparatus 200, displays the video according to the control of the processing apparatus 210. The display 132 displays, for example, the video of the receiver 51 captured by the camera 131, which is the UI apparatus 130 of the package hand-over apparatus 100.

The microphone 133, which is the UI apparatus 130 of the terminal apparatus 200, acquires the sound around the terminal apparatus 200 and outputs a voice signal of the acquired sound to the processing apparatus 210. The voice of the sender 50 is acquired by the microphone 133 of the terminal apparatus 200.

The speaker 134, which is the UI apparatus 130 of the terminal apparatus 200, outputs the sound according to the control of the processing apparatus 210. The speaker 134 outputs, for example, the voice of the receiver 51 acquired by the microphone 133, which is the UI apparatus 130 of the package hand-over apparatus 100.

The input apparatus 135, which is the UI apparatus 130 of the terminal apparatus 200, is an apparatus for the sender 50 to input to the terminal apparatus 200.

Figure 7:
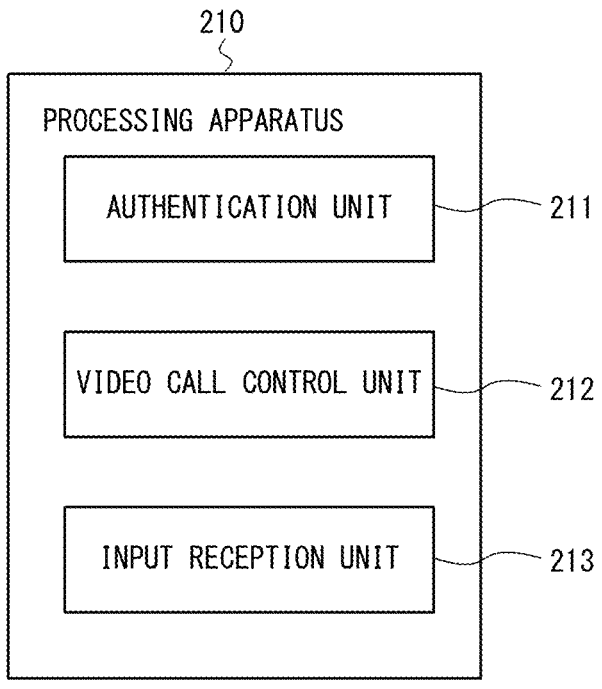
FIG. 7 is a block diagram showing an example of the functional configuration of the processing apparatus.

The processing apparatus 210 is an apparatus that performs predetermined processing. FIG. 7 is a block diagram showing an example of the functional configuration of the processing apparatus 210. As shown in FIG. 7, the processing apparatus 210 includes an authentication unit 211, a video call control unit 212, and an input reception unit 213.

The authentication unit 211 authenticates the sender 50. That is, the authentication unit 211 performs authentication processing to confirm whether or not a person who makes the input to approve hand-over is a legitimate person. Here, the legitimate person who makes the input to approve hand-over may be a person who has a predetermined qualification. Specifically, this legitimate person may be a person qualified to provide the receiver 51 with item to be handed over as the package 55. For example, if the items handed over as the package 55 are medicines, this legitimate person may be a person qualified as a pharmacist or a physician.

The authentication unit 211 may perform the authentication processing by acquiring specified information that proves the legitimate sender. For example, the authentication unit 211 may authenticate the sender 50 by biometric authentication. In this case, the authentication unit 211 may perform the authentication based on whether or not features extracted from a face image of the sender 50 captured by the camera 131 match the features of the face of the legitimate sender registered in advance. In addition, the authentication unit 211 may perform the biometric authentication based not only on the face but also on other physical features such as fingerprints and iris. In addition, the authentication unit 211 may perform the authentication processing other than biometric authentication. For example, the authentication unit 211 may perform the authentication based on whether or not personal information input to the terminal apparatus 200 through the input apparatus 135 matches personal information about a legitimate sender registered in advance.

The video call control unit 212 controls a video call with the package hand-over apparatus 100 using the UI apparatus 130 (video call device) described above. The video call control unit 212 carries out a video call with the package hand-over apparatus 100 when the package hand-over apparatus 100 arrives at the delivery destination of the package 55, i.e., the receiver 51. In this embodiment, the video call control unit 212 performs a video call with the package hand-over apparatus 100 when it receives a request for a video call from the package hand-over apparatus 100. Thus, the sender 50 can make a video call with the receiver 51.

When communication for the video call is established, the video call control unit 212 transmits a video of the sender 50 captured by the camera 131 of the terminal apparatus 200 and a voice of the sender 50 acquired by the microphone 133 to the package hand-over apparatus 100. The video call control unit 212 also receives the video and voice transmitted from the package hand-over apparatus 100, displays the received video on the display 132 of the terminal apparatus 200, and outputs the received voice from the speaker 134 of the terminal apparatus 200.

The video call control unit 212 may carry out a video call with the package hand-over apparatus 100 only if the authentication of the sender 50 is successful. That is, the video call control unit 212 may control not to carry out a video call with the package hand-over apparatus 100 if the authentication of the sender 50 fails in the authentication unit 211. With such a configuration, the package 55 can be more reliably prevented from being handed over upon an approval by a wrong person, i.e., a person other than the legitimate sender.

It should be noted that the video call control unit 212 does not necessarily need the authentication of the sender 50 to carry out a video call. In this case, the video call control unit 212 may carry out a video call triggered only by a request for the video call from the package hand-over apparatus 100. When the authentication of the authentication unit 211 is not required, the processing apparatus 210 needs not include the authentication unit 211.

The sender 50 makes a remote face-to-face confirmation of the receiver 51 by a video call before making an input approving hand-over of the package 55. In the face-to-face confirmation, the sender 50 may not only visually confirm the receiver 51 but also provide a predetermined explanation. For example, the sender may provide the receiver 51 with an explanation previously defined by a predetermined rule, such as law, before making an input approving hand-over of the package 55. That is, the sender 50 may provide the receiver 51 face-to-face through a video call with a predetermined explanation required for hand-over of the items that are the package 55. For example, if a medicine is delivered to the receiver 51 as the package 55, the sender 50, who is a pharmacist or a physician, provides an explanation about the medicine.

The input reception unit 213 receives an input indicating whether or not the hand-over of the package 55 to the receiver 51 is approved. The sender 50 makes such an input to the terminal apparatus 200, for example, through the input apparatus 135 of the terminal apparatus 200. When the sender 50 determines, as a result of the face-to-face confirmation by a video call, that there is no problem with the hand-over, the sender 50 makes an input that approves hand-over of the package 55 to the receiver 51, and when the sender 50 determines that there is a problem with the hand-over, he/she makes an input that does not approve the hand-over of the package 55 to the receiver 51. The input reception unit 213 may also receive an input that indicates whether or not a predetermined explanation required for the hand-over of the item that is the package 55 has been given to the receiver 51 by the sender 50.

Figure 8:
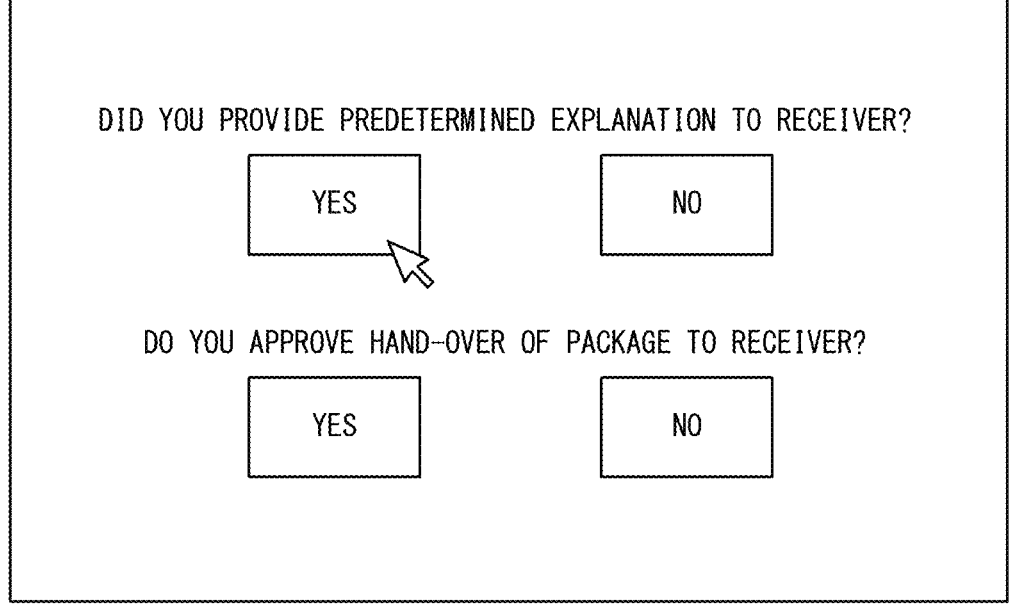
FIG. 8 is a schematic diagram showing an example of a screen displayed by an input reception unit on a display of the terminal apparatus.

The input reception unit 213 may provide a UI screen for receiving an input from the sender 50. FIG. 8 is a schematic diagram showing an example of the screen displayed by the input reception unit 213 on the display 132 of the terminal apparatus 200. In the example shown in FIG. 8, by the sender 50 selecting a button displayed as a UI component, an input indicating whether or not a predetermined explanation has been given and an input indicating whether or not the package 55 is approved to be handed over to the receiver 51 are made.

The input reception unit 213 transmits the received inputs to the package hand-over apparatus 100. That is, the input reception unit 213 transmits, to the package hand-over apparatus 100, at least information indicating whether or not to approve the hand-over of the package 55 to the receiver 51. The input reception unit 213 may transmit information indicating whether or not to approve the hand-over of the package 55 to the package hand-over apparatus 100, as well as information indicating whether or not the predetermined explanation has been given. The input reception unit 213 may also transmit, to the package hand-over apparatus 100, information indicating whether or not to approve the hand-over of the package 55, as well as information indicating whether or not the authentication unit 211 has successfully authenticated the sender 50.

Next, an example of the hardware configuration of the processing apparatus 210 will be described. The processing apparatus 210 has the same hardware configuration as that of the processing apparatus 140. That is, the processing apparatus 210 also includes a network interface, a memory, and a processor. The network interface of the processing apparatus 210 is used to communicate with any apparatus, such as a package hand-over apparatus 100. The memory of the processing apparatus 210 is used to store programs to be executed by the processor, data to be used for various processes of the terminal apparatus 200, etc. The processor of the processing apparatus 210 reads the programs from the memory and executes them to perform processing of each component shown in FIG. 7. Thus, the processing apparatus 210 has a function as a computer.

Figure 9:
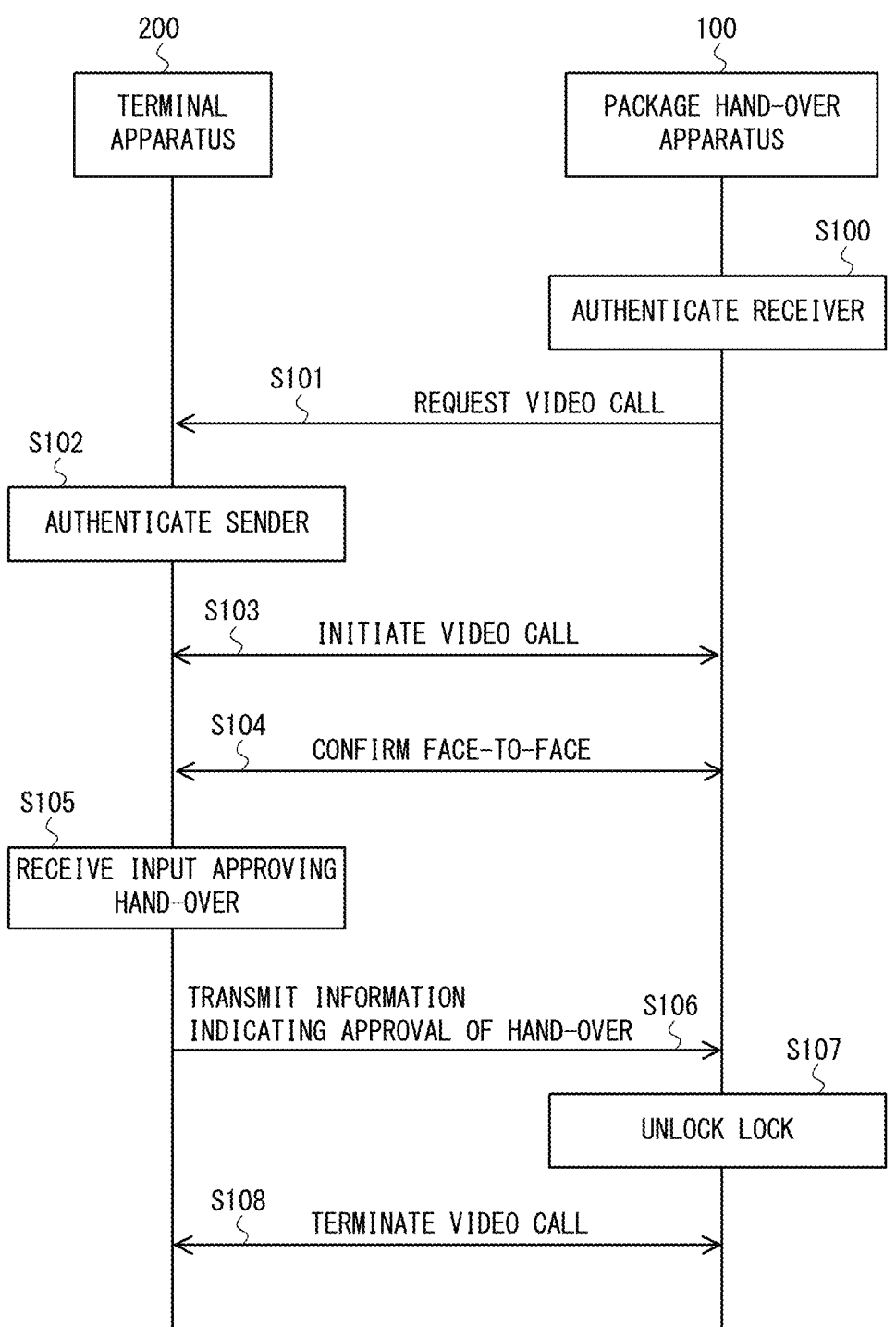
FIG. 9 is a sequence chart showing an example of an operation flow of the package hand-over system according to the embodiment.

Next, an example of an operational flow of the package hand-over system will be described. FIG. 9 is a sequence chart showing an example of the operational flow of the package hand-over system 10. An example of the operation will be described below with reference to FIG. 9.

When the package hand-over apparatus 100 arrives at the receiver 51, the authentication unit 142 first authenticates the receiver 51 in Step S100. In the sequence chart shown here, it is assumed that the authentication is successful.

Upon successful authentication of the receiver 51, in Step S101, the video call control unit 143 requests the terminal apparatus 200 to make a video call. Next, in Step S102, the authentication unit 211 of the terminal apparatus 200 authenticates the sender 50. In the sequence chart shown here, it is assumed that the authentication is successful.

Upon successful authentication of the sender 50, in Step S103, the video call control unit 143 of the package hand-over apparatus 100 and the video call control unit 212 of the terminal apparatus 200 initiate a video call. Then, in Step S104, the sender 50 remotely confirms the receiver 51 face-to-face by a video call.

Next, in Step S105, the input reception unit 213 of the terminal apparatus 200 receives an input from the receiver 51. In the sequence chart shown here, the input reception unit 213 receives an input approving hand-over of the package 55 to the receiver 51. As described above, at this time, the input reception unit 213 may further receive an input indicating whether or not the predetermined explanation has been given.

Next, in Step S106, the input reception unit 213 transmits the received input to the package hand-over apparatus 100. In the example shown here, the input reception unit 213 transmits, to the package hand-over apparatus 100, information indicating approval to hand over the package 55 to the receiver 51. Note that, as described above, the input reception unit 213 may further transmit, to the package hand-over apparatus 100, information indicating whether or not the predetermined explanation has been given and information indicating whether or not the sender 50 has been successfully authenticated.

Next, in Step S107, the lock control unit 144 of the package hand-over apparatus 100 determines whether or not to unlock the lock mechanism 125 based on the result of the face-to-face confirmation by the sender 50. That is, the lock control unit 144 determines whether or not to unlock the lock mechanism 125 based on the information transmitted from the terminal apparatus 200 in Step S106. In the example shown here, in Step S106, the lock control unit 144 unlocks the lock mechanism 125, because the information indicating approval to hand over the package 55 to the receiver 51 is transmitted from the terminal apparatus 200. Thus, the receiver 51 can obtain the package 55 stored in the storage unit 120. Note that, as described above, the lock control unit 144 may further determine whether or not to unlock the lock based on whether or not the authentication of the sender 50 is successful. The lock control unit 144 may also request the receiver 51 to input the unlock code. The lock control unit 144 may then determine whether or not to unlock the lock based on whether or not the unlock code entered by the receiver 51 is the correct unlock code.

Finally, in Step S108, the video call control unit 143 of the package hand-over apparatus 100 and the video call control unit 212 of the terminal apparatus 200 terminate the video call. The termination of the video call may be performed at any timing before Step S107.

The embodiment has been described above. According to the package hand-over system 10, the package 55 is handed-over after the sender 50 remotely confirms the receiver 51 face-to-face. For this reason, the package can be efficiently handed-over to the receiver 51 when it is preferable to hand over the package after a face-to-face confirmation, such as a medicine. Note that in the above described embodiment, the package hand-over apparatus 100 includes the movement apparatus 110 for moving the package hand-over apparatus 100. Therefore, since the package 55 can be delivered automatically, the package can be handed over to the receiver more efficiently. However, the package hand-over apparatus 100 does not necessarily have to include the movement apparatus 110. That is, the package hand-over apparatus 100 may be delivered from the sender 50 to the receiver 51 by being carried by a courier.

It should be noted that the present disclosure is not limited to the above embodiment and can be changed as appropriate without departing from the scope. For example, in the above embodiment, the package hand-over apparatus 100 includes the storage unit 120 and the processing apparatus 140 together, but these components may be provided separately. For example, some or all of the authentication unit 142, the video call control unit 143, and the lock control unit 144 may be implemented by an apparatus (e.g., a terminal apparatus such as a smartphone or a tablet terminal, or a server apparatus or the like) that is separate from the storage unit 120.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A package hand-over apparatus comprising:
   a video call control unit configured to carry out a video call with a terminal apparatus of a sender by using a video call device; and
   a lock control unit configured to unlock a lock prohibiting hand-over of a package based on whether or not an input approving the hand-over is made to the terminal apparatus of the sender after a start of the video call.

2. The package hand-over apparatus according to claim 1, wherein
   the lock control unit does not unlock the lock prohibiting the hand-over of the package when a user of the terminal apparatus has not been successfully authenticated as the sender.

3. The package hand-over apparatus according to claim 1, further comprising:
   an authentication unit configured to authenticate the receiver, wherein
   the video call control unit is configured to carry out the video call with the terminal apparatus of the sender upon successful authentication of the receiver.

4. The package hand-over apparatus according to claim 1, wherein
   the lock control unit does not unlock the lock prohibiting the hand-over of the package when the unlock code entered by the receiver is not a correct unlock code.

5. The package hand-over apparatus according to claim 1, further comprising:
   a movement apparatus configured to move the package hand-over apparatus.

6. A package hand-over method executed by a computer comprising:
   carrying out a video call with a terminal apparatus of a sender by using a video call device; and
   unlocking a lock prohibiting hand-over of a package based on whether or not an input approving the hand-over is made to the terminal apparatus of the sender after a start of the video call.

7. A non-transitory computer readable medium storing a program for causing a computer to execute:
   carrying out a video call with a terminal apparatus of a sender by using a video call device; and
   unlocking a lock prohibiting hand-over of a package based on whether or not an input approving the hand-over is made to the terminal apparatus of the sender after a start of the video call.

8. The package hand-over apparatus according to claim 1, wherein the video call control unit is configured to request the video call in response to authenticating a receiver of the package.

9. The package hand-over apparatus according to claim 1, wherein the video call control unit configured to terminate the video call prior to the lock control unit unlocking the lock.

10. The package hand-over apparatus according to claim 1, wherein the lock control unit is configured to unlock the lock based on satisfying a further condition of receiving an input from the terminal apparatus indicating that a predetermined explanation was given to a receiver of the package.

11. The package hand-over apparatus according to claim 1, wherein a receiver of the package and the second are different.

\* \* \* \* \*